United States Patent
Lee

(10) Patent No.: US 7,319,460 B2
(45) Date of Patent: Jan. 15, 2008

(54) ELECTRONIC DEVICE WITH RETRACTABLE STYLUS

(75) Inventor: Wei Lung Lee, Taipei (TW)

(73) Assignee: Benq Corporation, Taoyuan (TW)

( * ) Notice: Subject to any disclaimer, the term of this patent is extended or adjusted under 35 U.S.C. 154(b) by 638 days.

(21) Appl. No.: 10/865,575

(22) Filed: Jun. 10, 2004

(65) Prior Publication Data

US 2005/0168500 A1    Aug. 4, 2005

(30) Foreign Application Priority Data

Jan. 29, 2004    (TW) .............................. 93101949 A

(51) Int. Cl.
*G06F 3/033*    (2006.01)

(52) U.S. Cl. ..................................... 345/179

(58) Field of Classification Search ................ 345/179, 345/905; 178/18.01, 19.01–19.05
See application file for complete search history.

(56) References Cited

U.S. PATENT DOCUMENTS

| 5,180,891 A * | 1/1993 | Trumbo .................... 178/19.01 |
| 7,077,594 B1 * | 7/2006 | Annerino et al. ........... 401/258 |
| 2003/0067453 A1 * | 4/2003 | Liu et al. ..................... 345/179 |
| 2003/0184529 A1 * | 10/2003 | Chien et al. ................ 345/179 |

* cited by examiner

*Primary Examiner*—Amr A. Awad
*Assistant Examiner*—Randal L Willis
(74) *Attorney, Agent, or Firm*—Thomas, Kayden, Horstemeyer & Risley

(57) ABSTRACT

An electronic device with retractable stylus. The electronic device comprises a main body and a stylus. The stylus comprises a resilient member disposed therein and a latching mechanism for engaging the main body. To connect the stylus and the main body, the resilient member is deformed and the latching mechanism is engaged with the main body. When the latching mechanism separates from the main body, the resilient member exerts force to extend the stylus to make the stylus protruded from the main body.

16 Claims, 8 Drawing Sheets

ELECTRONIC DEVICE WITH RETRACTABLE STYLUS

BACKGROUND OF THE INVENTION

1. Field of the Invention

The present invention relates in general to an electronic device and in particular to an electronic device with retractable stylus.

2. Description of the Related Art

Generally, tablet-input equipped portable electronic devices, such as PDAs or mobile phones, provide a stylus as an accessory. Referring to FIG. 1, a conventional tablet-input equipped electronic device comprises a main body 10 and a stylus 20 detachably received thereto. The stylus 20 is used to operate the tablet panel 12 for data input. As shown in FIG. 1, the stylus 20 can be inserted into the channel 11 of the main body 10 for storage. However, insertion and removal of the stylus 20 from the electronic device may be considered inconvenient.

SUMMARY OF THE INVENTION

Accordingly, an object of the present invention is to provide an electronic device with a retractable stylus. The electronic device comprises a main body and a stylus. The stylus comprises a resilient member disposed therein and a latching mechanism for engaging the main body. To connect the stylus and the main body, the resilient member is deformed and the latching mechanism is engaged with the main body. When the latching mechanism separates from the main body, the resilient member exerts force to extend the stylus to make the stylus protruded from the main body.

DESCRIPTION OF THE DRAWINGS

The present invention will become more fully understood from the detailed description given hereinbelow and the accompanying drawings, given by way of illustration only and thus not intended to be limitative of the present invention.

DETAILED DESCRIPTION OF THE INVENTION

Figure 1:
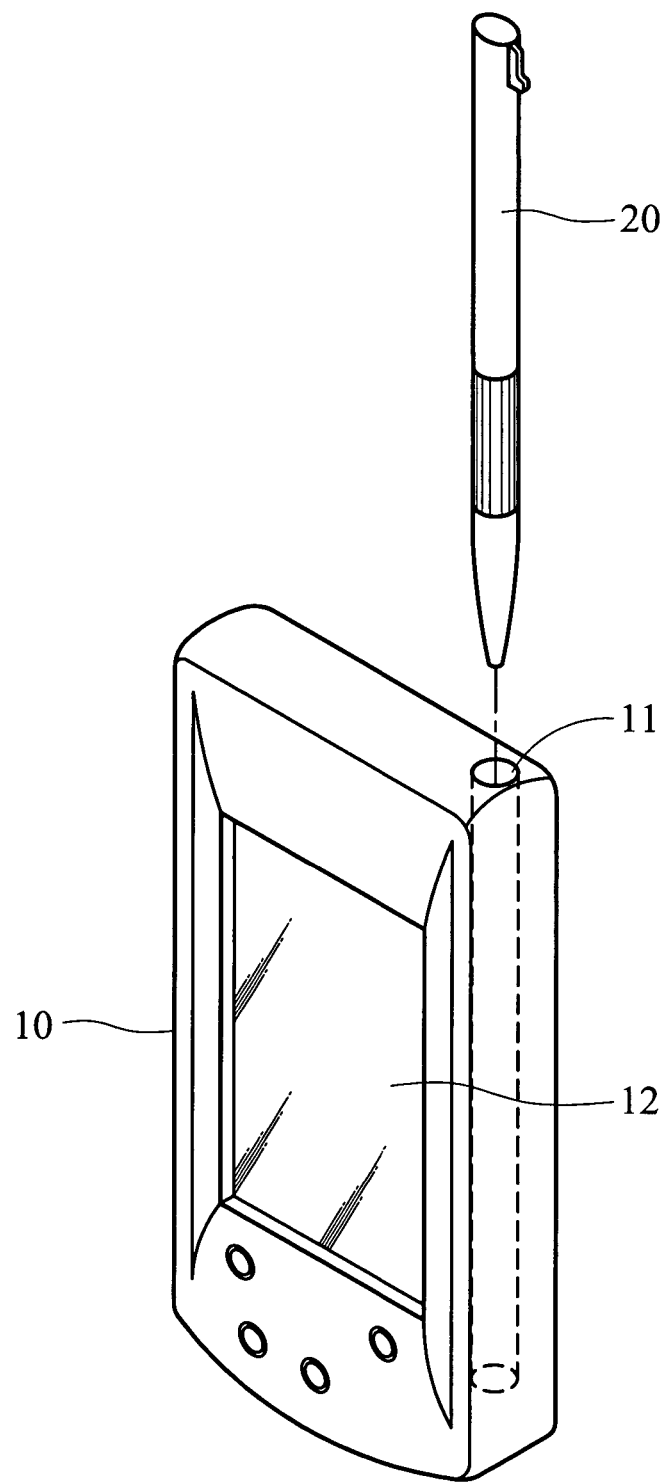
FIG. 1 is a perspective diagram of a conventional tablet-input equipped electronic device provided with a stylus.
Figure 2A:
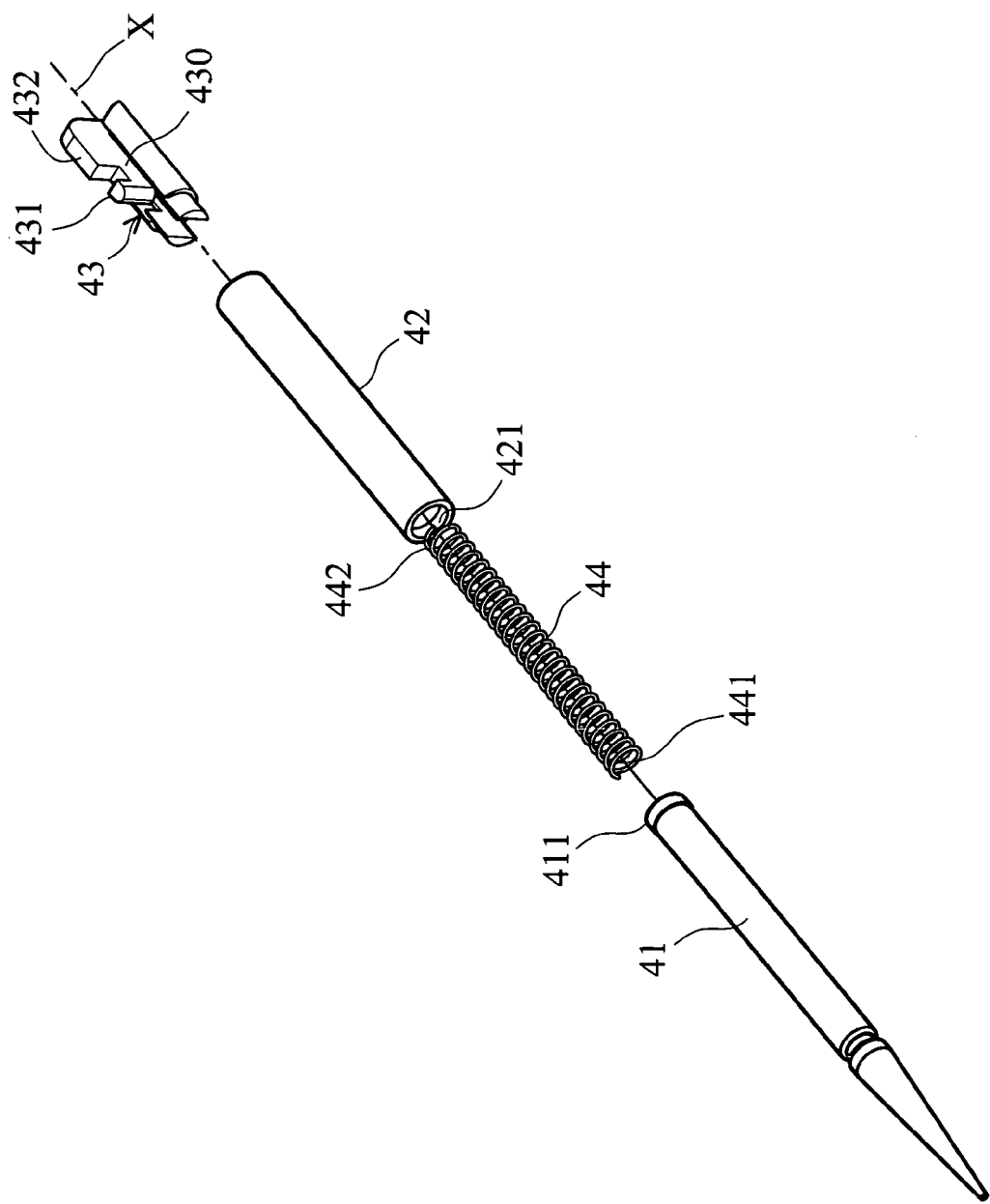
FIGS. 2a and 2b are exploded diagrams of the stylus according to the present invention.
Figure 2B:
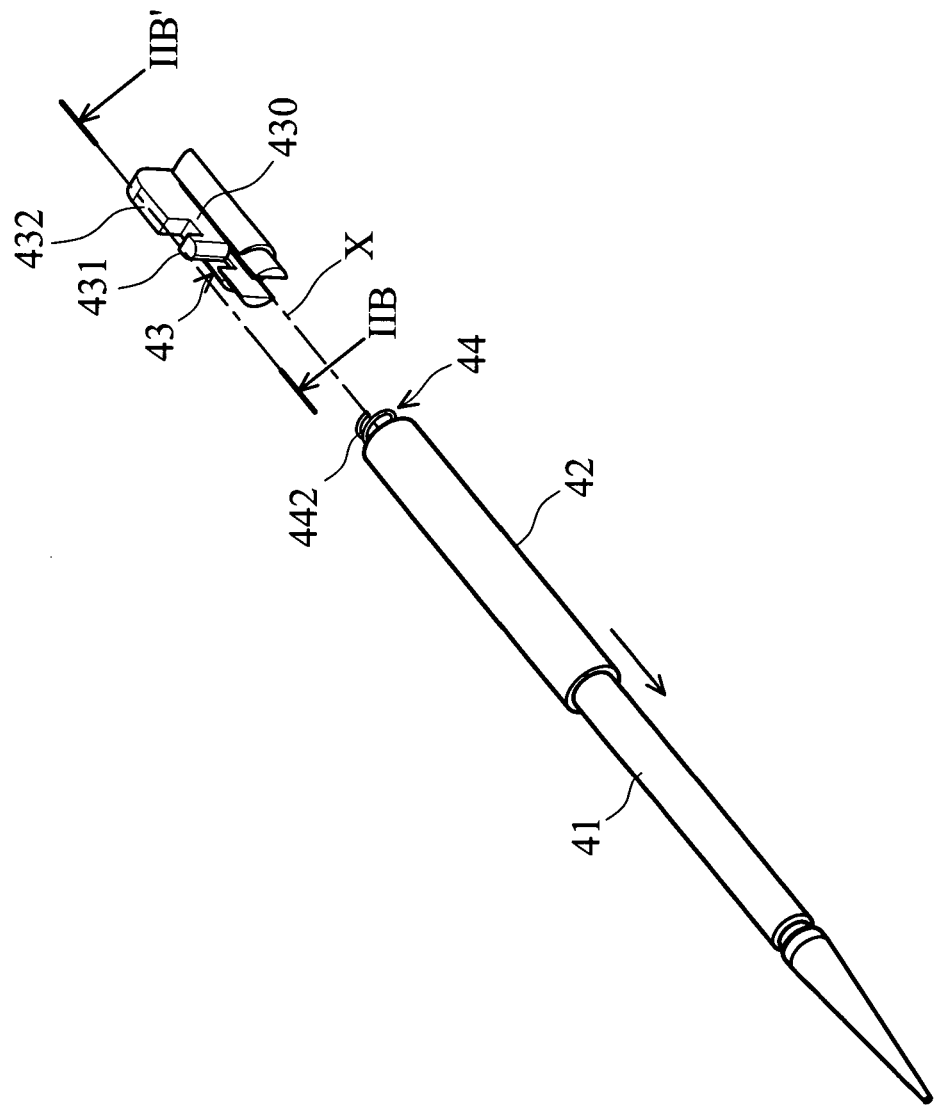

Referring to FIGS. 2a and 2b, the stylus 40 in this embodiment comprises a first body 41, a hollow second body 42, a latching mechanism 43 and a resilient member 44. The first body 41 is movably connected with the second body 42, thereby the stylus 40 is retractable along the longitudinal axis X. As shown in FIG. 2a, the first body 41 has a first flange 411, and the second body 42 has a corresponding second flange 421 restricting movement of the first body 41 therein and preventing separation. When the first body 41 slides outward from the second body 42 as indicated by the arrow in FIG. 2b, the stylus 40 extends to a maximum length with the second flange 421 blocking the first flange 411.

Figure 2C:
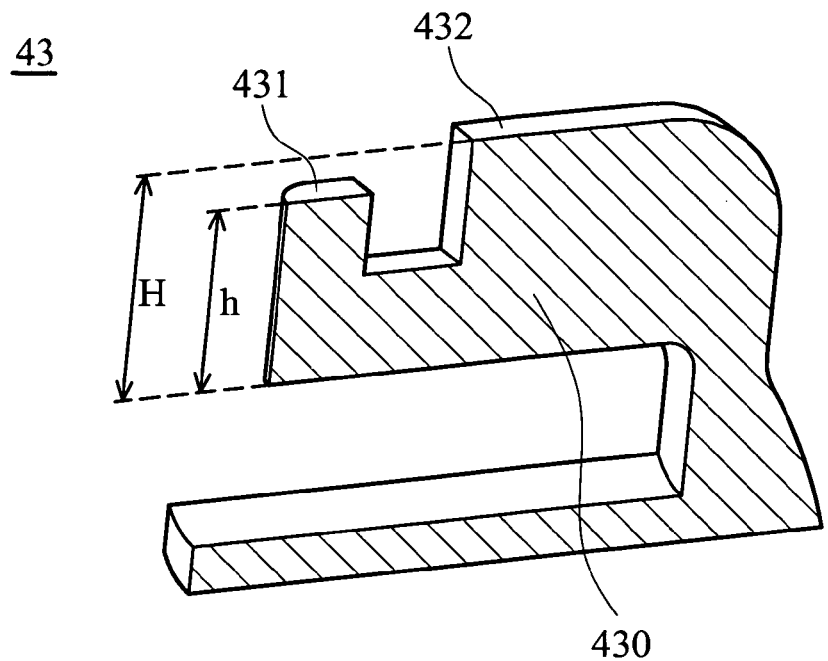
FIG. 2c is a sectional view of IIB-IIB' in FIG. 2b according to the present invention.

As shown in FIG. 2b, the latching mechanism 43 has a cantilever portion 430 substantially extended along the axis X. In FIG. 2c, the cantilever portion 430 has a first protrusion 431 at the free end thereof with height h and a second protrusion 432 with height H, wherein H>h. The latching mechanism 43, in FIG. 2b, is fixed to the end of the second body 42, wherein the first protrusion 431 is closer to the first body 41 than the second protrusion 432. In this embodiment, the resilient member 44 is a compression spring having a first end 441 abutting the first flange 411 and a second end 442 abutting the latching mechanism 43. The second end 442, however, can also abut a flange (not shown) inside the second body 42 restricting the resilient member 44 therein. As the resilient member 44 is compressed between the first body 41 and the latching mechanism 43, outward force from the second body 42 is applied to the first body 41 as shown by the arrow in FIG. 2b, and the stylus is thereby extended to an operational (maximum) length.

Figure 2D:
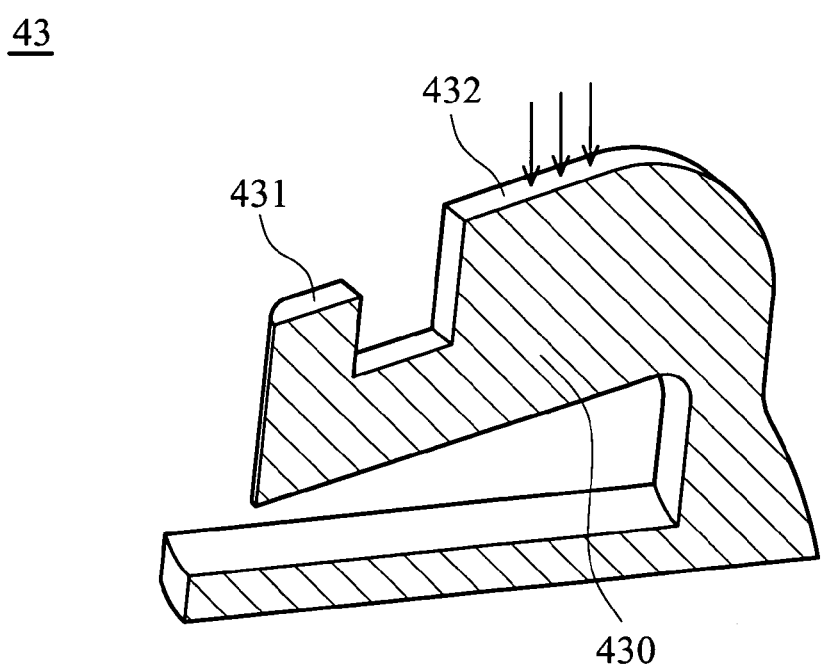
FIG. 2d is a sectional view showing the deformation of the cantilever portion according to the present invention.

With respect to the cantilever portion 430 in FIGS. 2c and 2d, the first protrusion 431 descends a greater distance than the second protrusion 432 when the second protrusion 432 is pressed downward as shown by the arrows in FIG. 2d. Subsequently, the cantilever portion 430 returns to the original position as shown in FIG. 2c by resilient force.

Figure 3A:
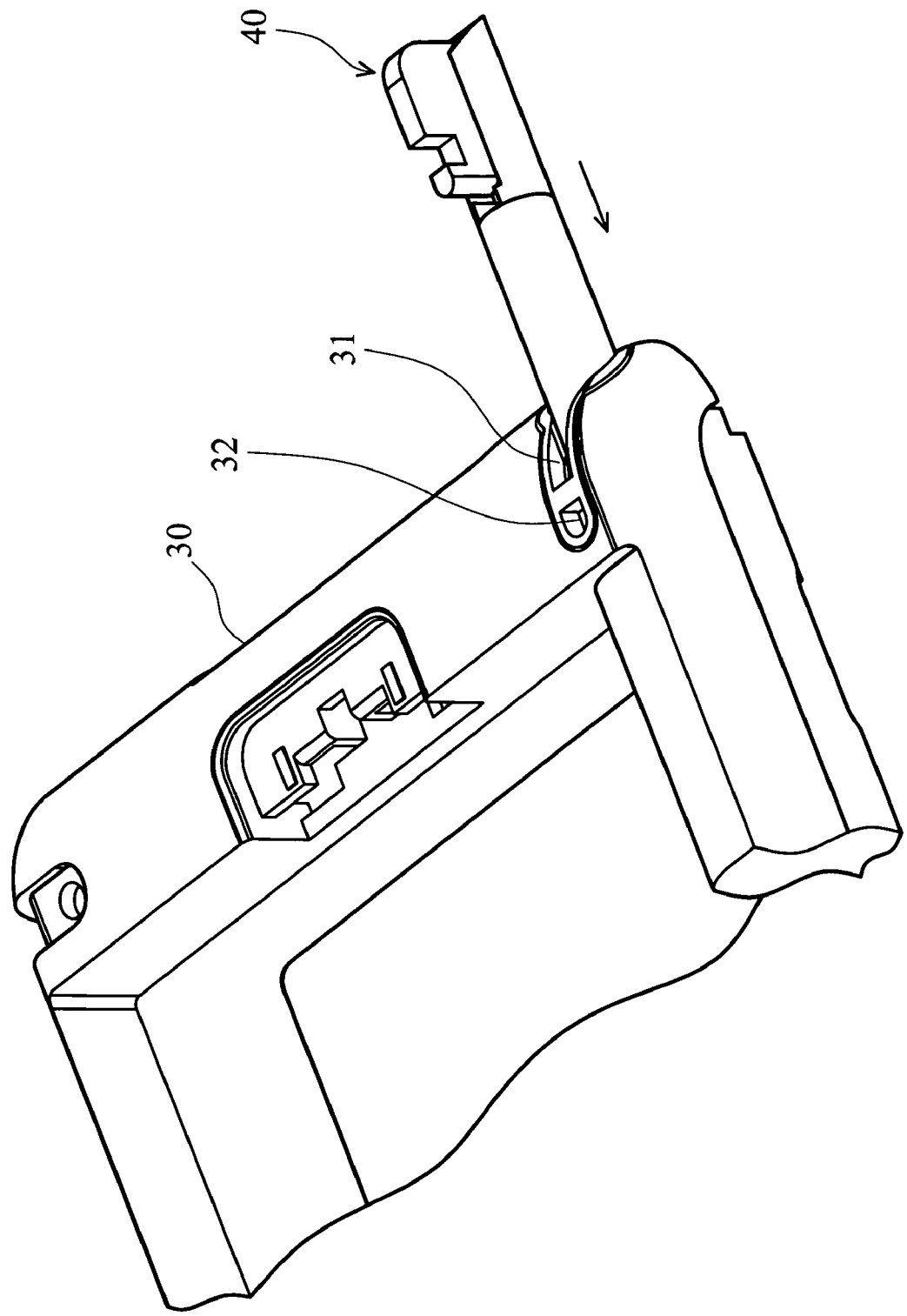
FIGS. 3a and 3b are perspective diagrams of the stylus engaging with the main body according to the present invention.
Figure 3B:
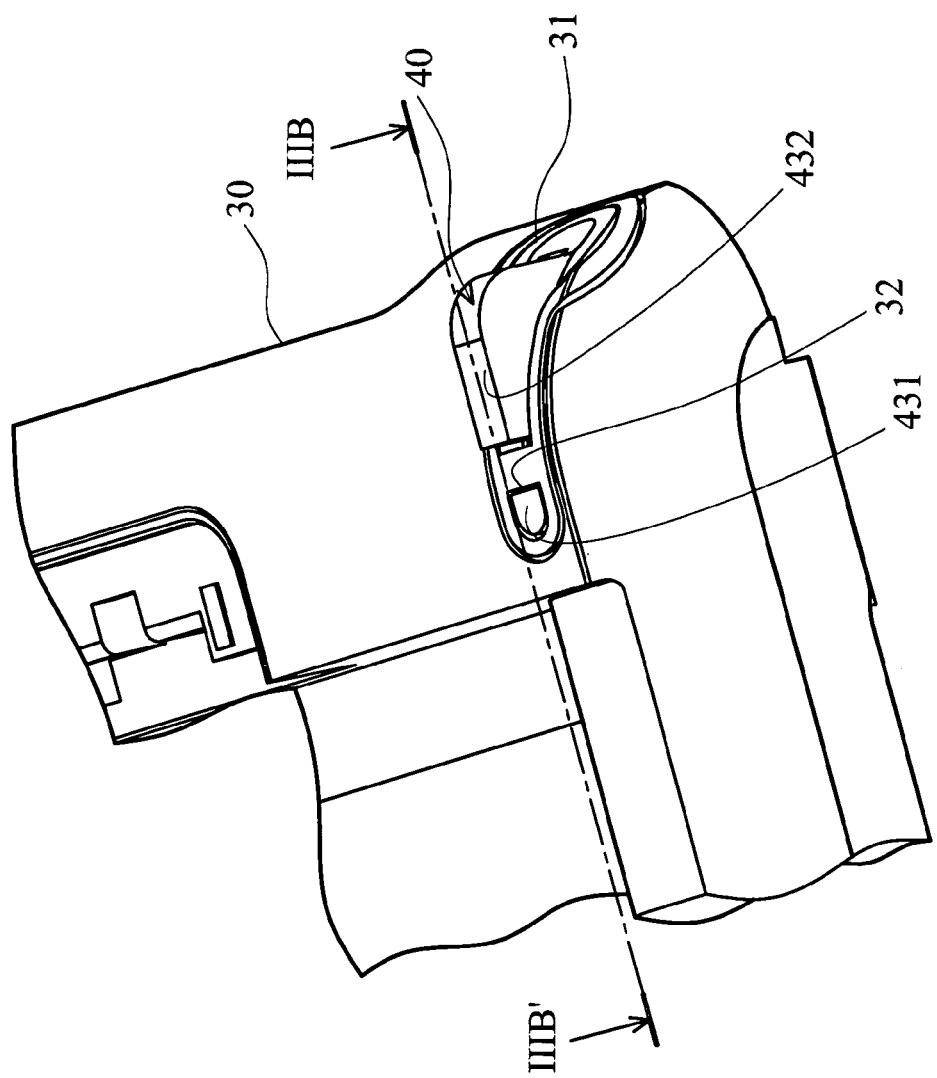

Referring to FIGS. 3a and 3b, the main body 30 of the electronic device comprises an opening 31 and a slot 32 for engaging the latching mechanism 43 of the stylus 40. As shown in FIG. 3b, the stylus 40 is restricted within the main body 30 by inserting the stylus 40 through the opening 31 and latching the first protrusion 431 with the slot 32.

Figure 4A:
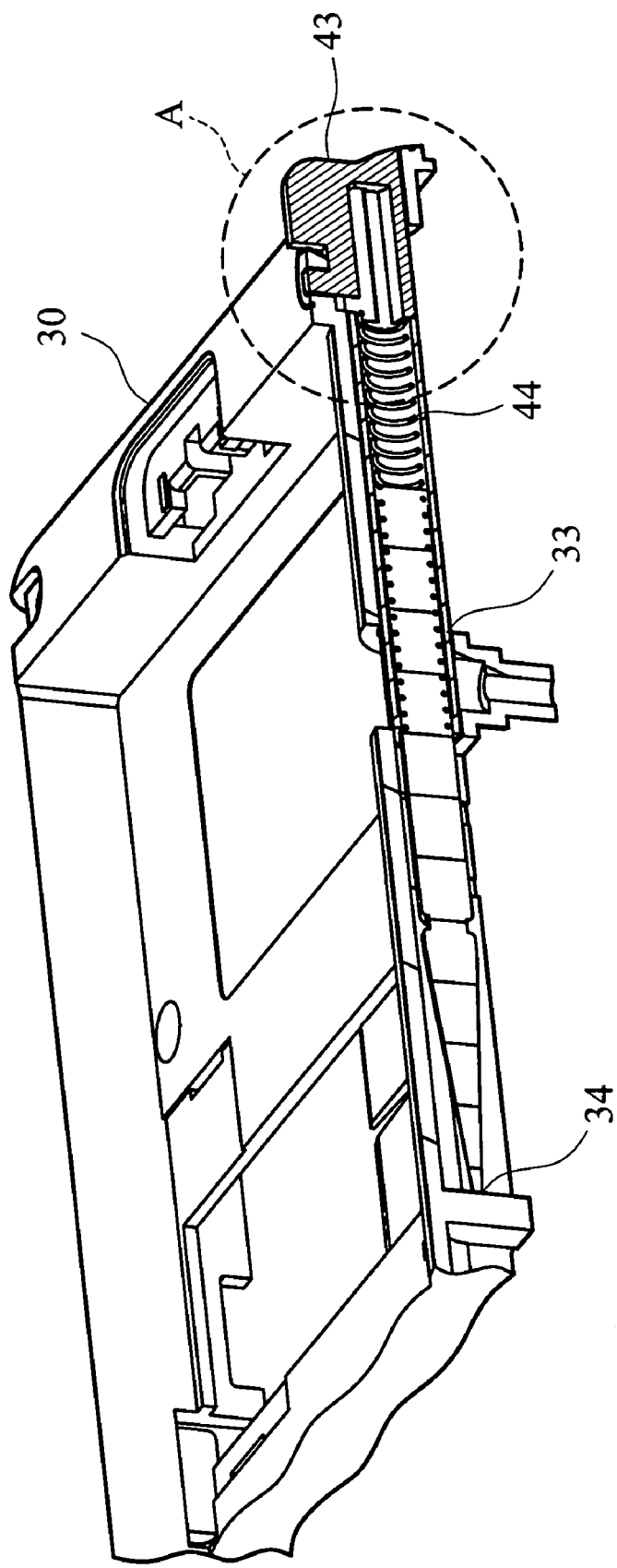
FIG. 4a is a sectional view of IIIB-IIIB' in FIG. 3b according to the present invention.
Figure 4B:
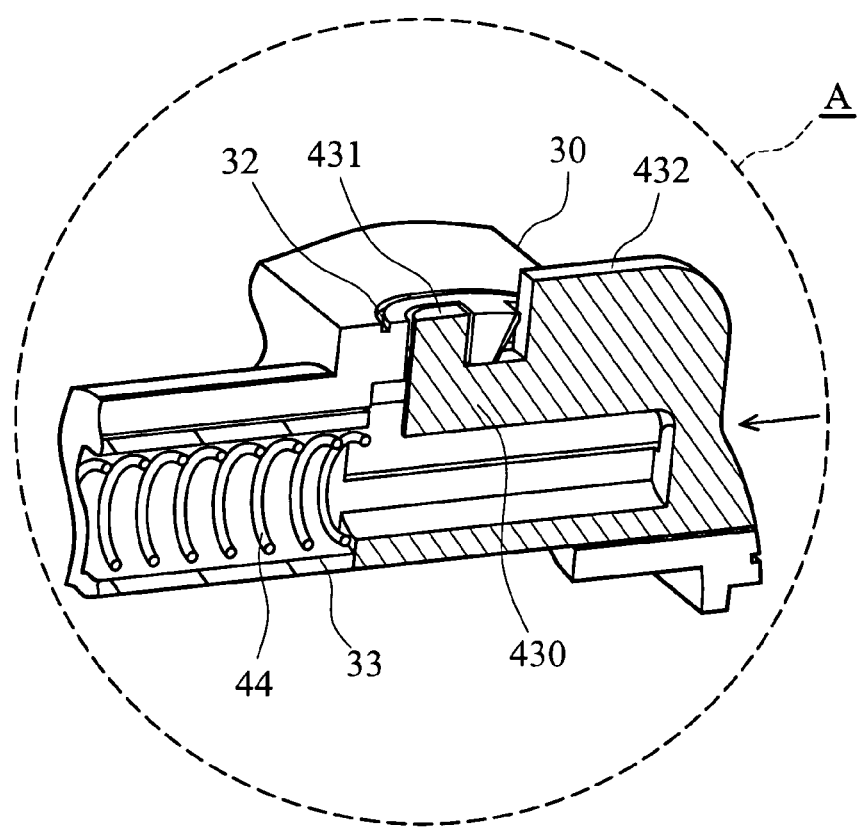
FIG. 4b is a perspective view of A in FIG. 4a according to the present invention.

Referring to FIGS. 4a and 4b, the main body 30 comprises a receiving portion 33 defining a receiving space communicating with the opening 31 and the slot 32 for receiving the stylus 40. As mentioned, the stylus 40 is inserted in the receiving portion 33 through the opening 31 with the first protrusion 431 latching the slot 32 such that the stylus 40 is restricted within the main body 30. In FIG. 4a, when the stylus 40 is inserted into the receiving portion 33 of the main body 30, an abutting surface 34 of the main body 30 blocks the tip of the first body 41 and forces the first body 41 to slide into the second body 42. Thus, the stylus 40 is retracted and the resilient member 44 is compressed.

Figure 4C:
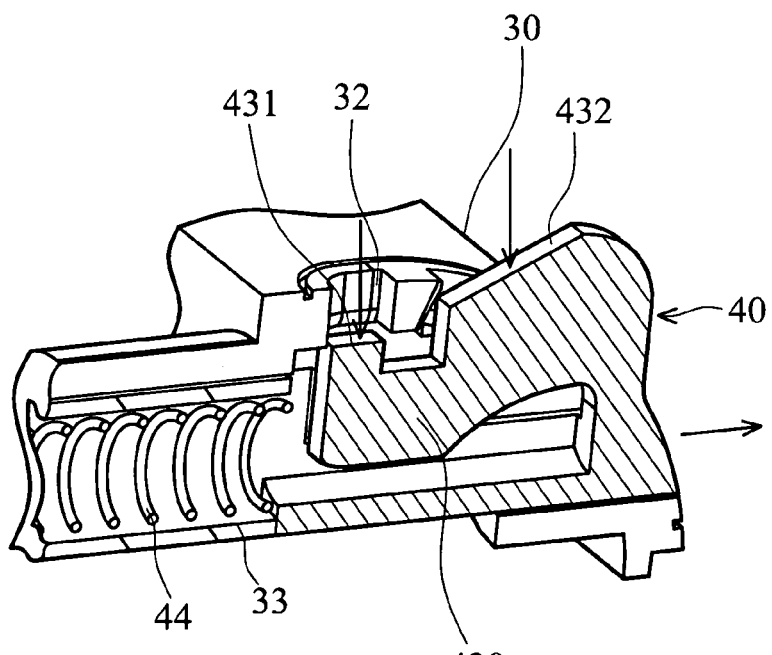
FIG. 4c is a perspective diagram of the first protrusion separating from the slot.

As shown in FIGS. 4b and 4c, as the cantilever portion 430 at the end of the stylus 40 is resilient, the second protrusion 432 can be pressed downward to incline the cantilever portion 430 for smooth insertion of the stylus 40 into the receiving portion 33. The first protrusion 431 passes through the opening 31 and engages the slot 32, securely connecting the stylus 40 and the main body 30, wherein the second protrusion 432 is located at the opening 31 adjacent to the main body 30.

When taking out the stylus 40, as shown in FIG. 4c, the second protrusion 432 is pressed downward, thereby the first protrusion 431 descends a distance and separates from the slot 32. Subsequently, due to the spring force of the compressed resilient member 44, the second body 42 moves away from the first body 41, so the stylus 40 extends out the main body 30 through the opening 31. That is, the first and second bodies 41 and 42 move apart along the X axis, and the stylus 40 extends to an operational (maximum) length for convenient removal.

The present invention provides a tablet-input equipped electronic device with retractable stylus. The retractable stylus can be easily stored in the main body. Moreover, the stylus can be easily removed from the main body due to the resilient member disposed therein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a main body comprising an opening, a slot and a receiving space communicating with the opening and the slot; and
   a stylus comprising a first body, a latching mechanism and a resilient member disposed between the first body and the latching mechanism, wherein the first body is movable with respect to the latching mechanism along a longitudinal axis, the first body and the latching mechanism are restricted within the receiving space when the latching mechanism engages the slot, and the resilient member forces the latching mechanism protruded from the main body along the longitudinal axis when the latching mechanism is separated from the slot;
   wherein the latching mechanism comprises a cantilever portion having a first protrusion movable perpendicular to the longitudinal axis to alternatively latch the slot by deforming the cantilever portion, and a second protrusion projecting through the opening and adjacent to the main body when the latching mechanism engages the slot, wherein when the second protrusion is pressed, the cantilever portion is deformed to separate the first protrusion from the slot.

2. The electronic device as claimed in claim 1, wherein the stylus further comprises a second body movably connecting the first body along the longitudinal axis and the latching mechanism formed on the second body, the first and second bodies are positioned closer to each other and the stylus is retracted when the latching mechanism engages the slot, and the resilient member exerts force moving the second body away from the first body to extend the stylus when the latching mechanism is separated from the slot.

3. The electronic device as claimed in claim 1, wherein the first body has a first flange at the end thereof, and the second body has a second flange abutting the first flange and restricting extension of the stylus.

4. A stylus, comprising:
   a first body extending along a longitudinal axis;
   a second body movably connecting the first body along the longitudinal axis;
   a latching mechanism disposed on the second body, comprising a cantilever portion, a first protrusion, and a second protrusion formed on the cantilever portion, wherein the first protrusion is positioned closer to the first body than the second protrusion and movable substantially perpendicular to the longitudinal axis by deforming the cantilever portion, and the second protrusion extends longer than the first protrusion; and
   a resilient member having a first end abutting the first body and a second end abutting one of the second body and the latching mechanism.

5. The stylus as claimed in claim 4, wherein the first body has a first flange at the end thereof, and the second body has a second flange blocking the first flange and restricting the extension of the stylus.

6. An electronic device, including:
   a main body comprising an opening, a slot and a receiving space communicating with the opening and the slot; and
   a stylus detachably connected to the main body, comprising a resilient member and a latching mechanism, wherein the stylus is restricted within the main body and the resilient member is deformed when the latching mechanism is engaged with the main body, and the resilient member exerts force to extend the stylus to make the stylus protruded from the main body when the latching mechanism is separated from the main body;
   wherein the latching mechanism comprises a cantilever portion having a first protrusion movable perpendicular to the longitudinal axis to alternatively latch the slot by deforming the cantilever portion, and a second protrusion projecting through the opening and adjacent to the main body when the latching mechanism engages the slot, wherein when the second protrusion is pressed, the cantilever portion is deformed to separate the first protrusion from the slot.

7. The electronic device as claimed in claim 6, wherein the stylus further comprising a first body and a second body retractably connecting the first body, and the second body is between the first body and the latching mechanism when the first body extends.

8. The electronic device as claimed in claim 7, wherein the second body is hollow with the resilient member disposed therein and compressed between the first body and the latching mechanism.

9. The electronic device as claimed in claim 8, wherein the latching mechanism is fixed to the second body.

10. The electronic device as claimed in claim 6, wherein the cantilever portion is substantially extended along the longitudinal axis, and the first protrusion is disposed at the free end of the cantilever portion.

11. The electronic device as claimed in claim 6, wherein the second protrusion extends longer than the first protrusion, and the first protrusion is closer to the first body than the second protrusion.

12. An electronic device, including:
    a main body, comprising a slot and a receiving space communicating with the slot; and
    a stylus movably received within the receiving space, comprising:
    a stylus body extending along a longitudinal axis;
    an elastic latching mechanism formed on the stylus body, the latching mechanism comprising a free end, a first protrusion and a second protrusion, the first protrusion being closer to the free end than the second protrusion;

wherein the first protrusion is movable substantially perpendicular to the longitudinal axis by deforming the latching mechanism;

wherein the first protrusion is engaged with the slot when the latching mechanism is free of deformation, and the first protrusion is separated from the slot when the elastic latching mechanism is deformed by pressding the second protrusion.

13. The electronic device as claimed in claim 12, the elastic latching mechanism further comprising a cantilever portion formed at an end of the stylus.

14. The electronic device as claimed in claim 12, wherein the second protrusion is extended longer than the first protrusion.

15. The electronic device as claimed in claim 12, wherein the first protrusion is disposed at the free end of the elastic latching mechanism.

16. The electronic device as claimed in claim 12, the main body further comprising an opening, wherein the second protrusion is engaged with the opening when the latching mechanism is free of deformation and the stylus is received within the receiving space.

* * * * *